May 12, 1925.
C. M. PALMER
TRACTION WHEEL
Filed Aug. 31, 1923
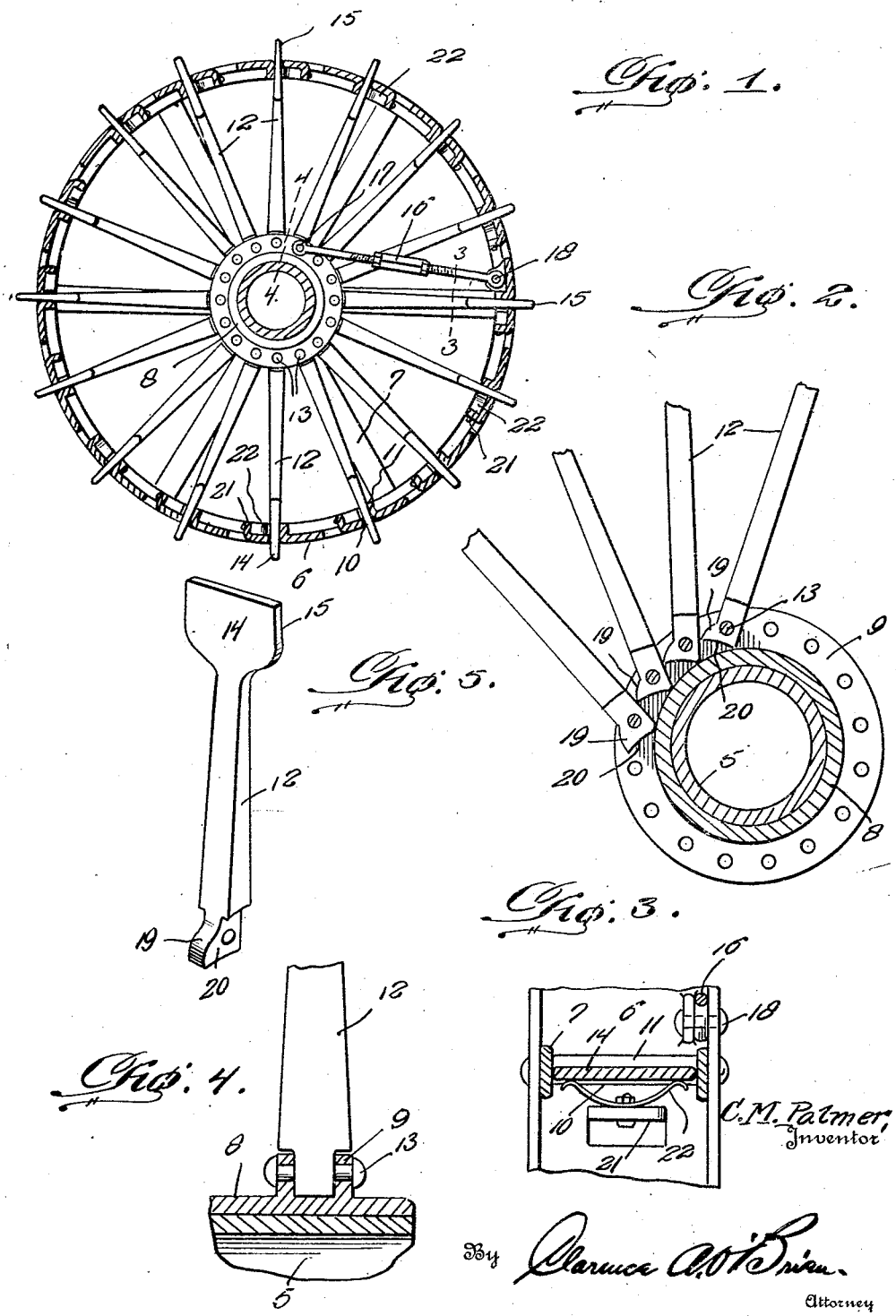

Patented May 12, 1925.

1,537,491

UNITED STATES PATENT OFFICE.

CHARLES M. PALMER, OF ABINGDON, VIRGINIA.

TRACTION WHEEL.

Application filed August 31, 1923. Serial No. 660,291.

*To all whom it may concern:*

Be it known that I, CHARLES M. PALMER, a citizen of the United States, residing at Abingdon, in the county of Washington and State of Virginia, have invented certain new and useful Improvements in Traction Wheels, of which the following is a specification.

This invention relates to traction wheels for vehicles and has particular reference to wheels of the above kind which embody movable spurs having means for manually projecting or retracting the same relative to the surface of the wheel rim whereby the wheel will operate most efficiently in exact accordance with the condition or nature of the ground or road upon which the wheel is adapted to travel.

An object of the invention is to provide a wheel of the above kind which embraces the desired qualities of simplicity and durability of construction as well as efficiency in operation.

Another object is to provide a traction wheel which will be found particularly useful for motor driven tractors or other vehicles, which require positive tractive effort.

A further object of the invention is to provide a traction wheel which may be readily manipulated for projecting or retracting the spurs thereof, and wherein the spur projecting and retracting means furnishes a durable and efficient means for retaining the spurs in any position in which they are set.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views:

Figure 1 is a view partly in side elevation and partly in vertical longitudinal section of a traction wheel constructed in accordance with the present invention.

Figure 2 is an enlarged fragmentary sectional view taken substantially centrally of the wheel and illustrating the mounting of the inner ends of the spurs.

Figure 3 is a fragmentary sectional view taken substantially on the line 3—3 of Figure 1 and drawn on a larger scale.

Figure 4 is a fragmentary rail sectional view taken substantially upon the line 4—4 of Figure 1 and drawn on a larger scale, and Figure 5 is an enlarged perspective view of one of the spurs.

Referring more in detail to the drawing, 5 indicates a cylindrical hub which may be provided with end flanges, and which is rigidly connected to a cylindrical rim 6 surrounding the same and concentric therewith by means of radial spokes 7, the rim 6 being preferably of channel form as shown with inwardly projecting side flanges and the spokes 7 preferably having their ends suitably rigidly attached to the rim and hub flanges by bolts or rivets.

Rotatably fitted upon the hub 5 is a sleeve 8 that may be removed from the hub 5 by making one of the end flanges of the latter detachable, and as shown clearly in the several views, the sleeve 8 is provided with a pair of circumferential annular flanges 9 that are arranged in adjacent spaced relation centrally between the ends of the sleeve 8. The rim 6 is provided with a plurality of uniformly spaced transversely elongated slots 10 that are preferably formed by stamping inwardly projecting lugs 11 from the rim 6, and substantially radially extending spurs 12 have their outer ends loosely positioned in the slots 10 and are pivotally connected at their inner ends between the flanges 9 by means of rivets or the like. As shown clearly in Figure 5, the outer ends of the spurs 12 are preferably broad, as indicated at 14 and provided with sharpened outer edges as at 15 so as to give positive tractive effort in the operation of the wheel. As the spurs 12 are pivotally connected to the sleeve 8 and are loosely slidably mounted in the slots 10, it is apparent that these spurs may be projected beyond the periphery of the rim 6 by rotating said sleeve 8 on the hub 5 so as to position said spurs in a true radial arrangement as shown in Figure 1. On the other hand, it is apparent that when the sleeve 8 is reversely rotated, the spurs will assume a tangential position so as to have their outer ends retracted toward the periphery of the rim 6 or flush with the latter. In this manner, it is readily apparent that the degree of projection or retraction of the spurs may be readily regulated.

In order to provide for the rotation of the sleeve 8 upon the hub 5 for regulating the projection or retraction of the spurs 12 and to maintain the sleeve 8 in any rotarily adjusted position, said sleeve is connected with the rim 6 by means of a turnbuckle generally indicated at 16, the ends of the turnbuckle being pivoted as at 17 to the sleeve and at 18 to the rim.

It is highly desirable that when the spurs are fully projected, that they be effectively supported against inward displacement, and for this purpose the inner ends of the same are provided with lateral enlargements indicated at 19 and are formed with arcuate or concaved inner edges as at 20, so that a broad bearing surface is provided for engaging the periphery of the sleeve 8 in this position of the spur. This will take considerable strain off of the pivots 13 of the spur when the latter are in use or projected.

The rim 6 is provided with a plurality of inwardly projecting lugs 21 between the slots 10, which lugs 21 are preferably formed by bending the same inwardly from the rim 6, and to each of these lugs 21 is fastened a U-shaped spring 22 which is arranged to have its ends bear upon the adjacent side of the adjacent spurs 12 for holding the latter against rattling and in contact with the adjacent side of lug 11.

The spurs 12 are preferably tapered narrower toward their outer ends, so that the latter portions of the spurs may fulcrum in the slot 10 as is necessary due to the change in angular relation to the rim and hub when being projected or retracted, the width of the spurs being such that they will snugly fit in the slot 10 when fully projected, so that a rigid construction is had at this time. It is of course, to be understood that the turnbuckle 16 will normally and at all times assume a tangential position so that when the length of the turnbuckle is adjusted, the desired operation or rotation of the sleeve 8 will be effected.

From the foregoing description, it is believed that the construction and operation as well as the advantages of the invention will be readily understood by those skilled in the art.

Minor changes may be made without departing from the spirit and scope of the invention as claimed.

What I claim as new is:

1. A traction wheel comprising a hub and a rim held concentrically with relation to the hub, a sleeve rotatably mounted upon the hub, a rim having transversely disposed slots with flanges at the opposite sides thereof, the flanges at one side of the slots being spaced from the edges thereof, traction spurs pivotally connected at their inner ends with the sleeve and passing through the slots, springs interposed between the traction spurs and the flanges which are spaced from the edges of the slots and means for turning the sleeve with relation to the hub and the rim.

2. A traction wheel comprising a hub and a rim held concentrically with relation to the hub, a sleeve rotatably mounted upon the hub, means for turning the sleeve with relation to the hub and the rim, a rim having transversely disposed slots, traction spurs pivotally connected at their inner ends with the sleeve and passing through the slots of the rim, the traction spurs being provided at their inner ends and at one side of their points of pivotal connection with the sleeve with laterally disposed enlargements adapted to engage the periphery of the sleeve when the said spurs are disposed radially with relation to the sleeve.

In testimony whereof I affix my signature.

CHAS. M. PALMER.